US012737120B2

(12) United States Patent
N et al.

(10) Patent No.: US 12,737,120 B2
(45) Date of Patent: Sep. 15, 2026

(54) RELINKING SCHEME FOR SUB-BLOCKS OF GROWN BAD MEMORY BLOCKS

(71) Applicant: Sandisk Technologies, Inc., Milpitas, CA (US)

(72) Inventors: Mohith Kumar N, Bangalore (IN); Sri Harsha Chintamaneni, Bangalore (IN); Shashikumar Jk, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/761,680

(22) Filed: Jul. 2, 2024

(65) Prior Publication Data

US 2026/0010291 A1 Jan. 8, 2026

(51) Int. Cl.
*G06F 3/06* (2006.01)

(52) U.S. Cl.
CPC ............ *G06F 3/0613* (2013.01); *G06F 3/064* (2013.01); *G06F 3/0679* (2013.01)

(58) Field of Classification Search
None
See application file for complete search history.

(56) References Cited

U.S. PATENT DOCUMENTS 9,460,815 B2 10/2016 Sivasankaran et al.
10,832,790 B1 11/2020 Bhatnagar et al.
11,456,050 B2 9/2022 Chandramani et al.
11,537,484 B2 12/2022 Namala et al.
2020/0409808 A1 12/2020 Seetharaman et al.
2022/0270703 A1* 8/2022 Chandramani ..... G11C 11/5671
2025/0014670 A1* 1/2025 Park .................... G11C 16/349

* cited by examiner

*Primary Examiner* — Kevin Verbrugge
(74) *Attorney, Agent, or Firm* — DENTONS Durham Jones Pinegar

(57) ABSTRACT

A data storage device includes a memory block relinking system. The memory block relinking system identifies memory blocks that have been identified as grown bad blocks. The memory block relinking system analyzes the memory blocks that have been identified as grown bad blocks to determine whether a sub-block of the memory block is salvageable. To determine whether the sub-block is salvageable, the memory block relinking system executes one or more operations on the sub-block. If the operation fails, the sub-block is retired. If the operation is successful, the memory block relinking system identifies the sub-block as a relinking candidate. The memory block relinking system logically links the sub-block that was identified as a relinking candidate with one or more other sub-blocks that were previously identified as relinking candidates to form a metablock.

20 Claims, 9 Drawing Sheets

RELINKING SCHEME FOR SUB-BLOCKS OF GROWN BAD MEMORY BLOCKS

BACKGROUND

As the capacity of data storage devices continues to increase, a size of the memory blocks of the data storage device is also increasing. Although the memory block size is increasing, the number of memory blocks in the data storage device is decreasing, which leads to lower memory block budgets, a reduction of data allocation efficiency and a reduction in speed.

To overcome the effects of larger memory block sizes, the concept of a sub-block mode has been introduced. In the sub-block mode, a memory block is divided into two sub-blocks—an upper sub-block and a lower sub-block. Each sub-block can be erased, programmed and read separately.

Over time, one of the sub-blocks may grow into a bad memory block (referred to herein as a grown bad block). When one of the sub-blocks fails and/or is identified or marked as a grown bad block, the other sub-block is also identified or marked as a grown bad block-even if that sub-block is fully functional. This leads to the loss of an entire memory block which reduces the capacity of the data storage device.

Accordingly, it would be beneficial to salvage a sub-block of a memory block when the other sub-block of the memory block has been identified as a grown bad block.

SUMMARY

The present disclosure describes a data storage device, such as, for example, a NAND data storage device, that includes a memory block relinking system. In an example, the memory block relinking system identifies memory blocks that have been marked, classified or otherwise identified as a grown bad block (e.g., at least one sub-block of the memory block has been identified as having failed a program function, an erase function or has otherwise failed).

To determine whether at least at least one sub-block of the grown bad block is salvageable, the memory block relinking system executes one or more operations on the at least one sub-block of the memory block that was identified as the grown bad block. If the operation fails, the sub-block is retired. However, if the operation is successful, the memory block relinking system marks, classifies or otherwise identifies the sub-block as a relinking candidate. The memory block relinking system may then logically link the sub-block that was identified as a relinking candidate with one or more other sub-blocks that were previously identified as relinking candidates to form a metablock.

Accordingly, examples of the present disclosure describe a method that includes identifying one or more memory blocks in a list of grown bad blocks. In an example, each of the one or more memory blocks in the list of grown bad blocks is divided into a first sub-block and a second sub-block. An operation is executed on the first sub-block of a first memory block of the one or more memory blocks and a determination is made as to whether the operation on the first sub-block of the first memory block is successful. Based, at least in part, on determining the operation on the first sub-block of the first memory block is successful, the first sub-block of the first memory block is identified as a sub-block relinking candidate.

Other examples describe a data storage device that includes a controller and a memory block relinking system. In an example, the memory block relinking system is operable to execute at least one operation on at least one of a first sub-block and a second sub-block of a memory block that has been identified as a grown bad block. The memory block relinking system is also operable to identify the at least one of the first sub-block and the second sub-block of the memory as a relinking candidate based, at least in part, on a determination that the at least one operation performed on the at least one of the first sub-block and the second sub-block is successful. The memory block relinking system logically links the at least one of the first sub-block and the second sub-block to a corresponding sub-block of another memory block that was identified as a grown bad block. In an example, the memory block relinking system also successfully executed at least one operation on the corresponding sub-block that is logically linked to the at least one of the first sub-block and the second sub-block.

Examples of the present disclosure also describe a data storage device that includes means for executing an operation on a first sub-block of a first memory block of one or more memory blocks that have been identified as a grown bad block. The data storage device also includes means for determining whether the operation on the first sub-block of the first memory block is successful. In an example, the data storage device also includes means for identifying the first sub-block of the first memory block as a sub-block relinking candidate based, at least in part, on a determination that the operation on the first sub-block of the first memory block is successful.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
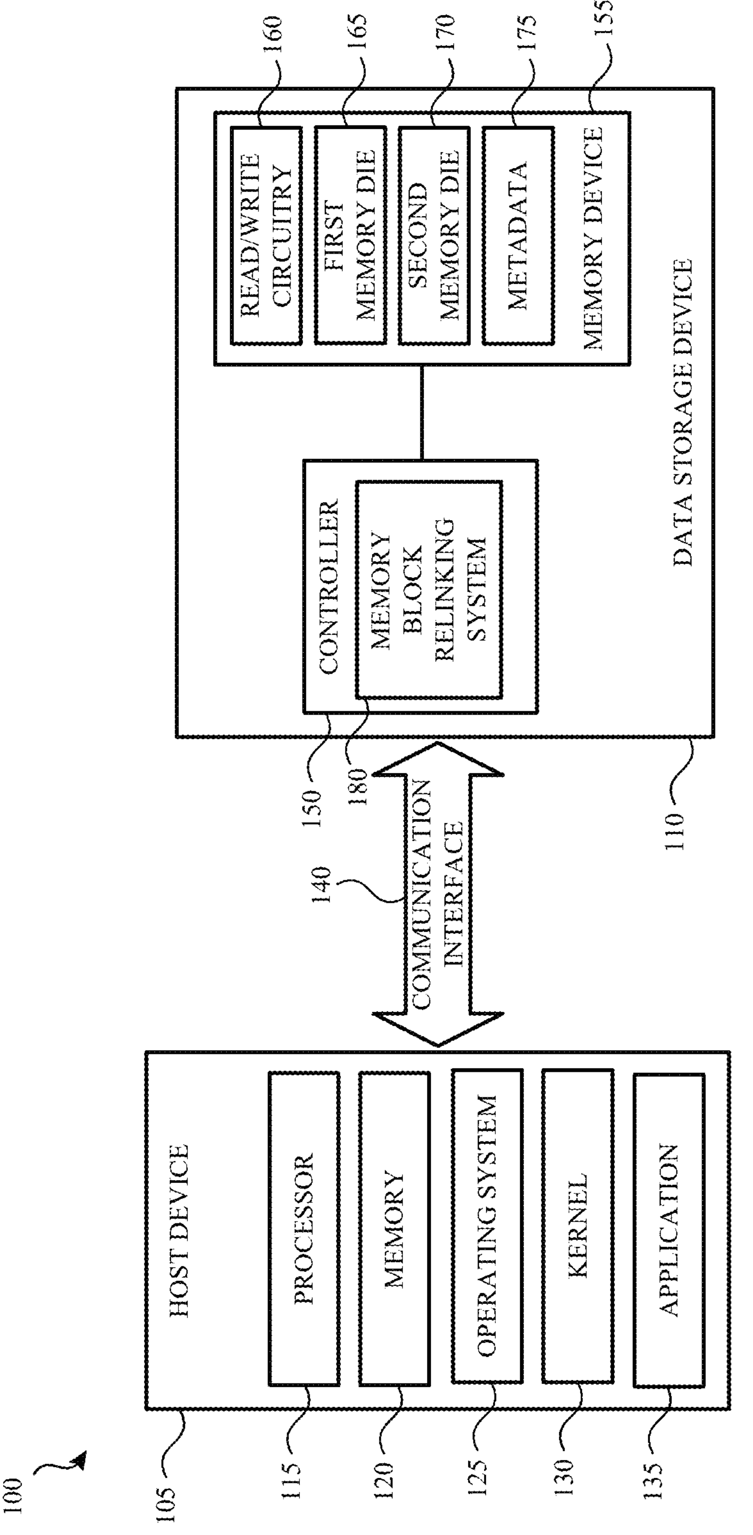
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

The demand for data storage devices, such as NAND data storage devices, is increasing. As the demand for data storage devices increases, so does the demand for higher density, higher capacity and better performance. To increase capacity, the number of wordlines in physical memory blocks of memory dies is getting larger. As the number of wordlines increases, so does the size of the memory block. However, as the size of the memory block increases, the number of memory blocks in the data storage device is decreasing. As a result, there is a reduction in data allocation efficiency and speed.

To overcome the above, memory blocks are divided into two sub-blocks—an upper sub-block and a lower sub-block. Each sub-block may be separately erased, programmed and/or read.

Over time, one of the sub-blocks of the memory block may grow into a bad memory block-referred to as a grown bad block. For example, one of the sub-blocks may experience a program failure, an erase failure or other type of failure that causes the sub-block to be identified as a grown bad block.

When one of the sub-blocks is identified, classified and/or marked as a grown bad block, the other sub-block is also identified, classified and/or marked as a grown bad block, even if that sub-block is fully functional. As a result, the entire memory block is lost and the capacity of the data storage device is reduced.

To address the above, the present disclosure describes a data storage device that includes a memory block relinking system. The memory block relinking system identifies memory blocks that have been marked, classified and/or otherwise identified as a grown bad block.

When one or more memory blocks have been identified as grown bad blocks, the memory block relinking system executes one or more operations on at least one sub-block of each of the one or more memory blocks that have been identified as grown bad blocks. If the operation fails, the sub-block is retired. However, if the operation is successful, the memory block relinking system marks, classifies and/or otherwise identifies the sub-block as a relinking candidate. The memory block relinking system logically links the relinking candidate sub-block with one or more previously identified (or subsequently identified) relinking candidate sub-blocks to form a metablock.

In an example, and due to wordline selection constraints, the formation of the metablock is a combination of similar sub-blocks. For example, because of how the wordlines in each sub-block are logically identified, a first sub-block in one memory block can only be logically linked to a first sub-block of another memory block (e.g., another memory block of another memory die and/or plane). Likewise, a second sub-block of one memory block can only be combined with other second sub-blocks of one or more other memory blocks during the formation of a metablock.

In accordance with the above, many technical benefits may be realized including, but not limited to, improving the memory die yield by enabling sub-blocks of factory marked bad blocks to be relinked to other sub-blocks and increasing the life of the data storage device by enabling functional sub-blocks to be reclaimed, thereby increasing the life of the data storage device.

These benefits, along with other examples, will be shown and described in greater detail with respect to FIG. 1-FIG. 9.

FIG. 1 is a block diagram of a system 100 that includes a host device 105 and a data storage device 110 according to an example. In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. In an example, the controller 150 is communicatively coupled to the memory device 155. The memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. In one example, the memory cells are arranged in a two-dimensional configuration. In another example, the memory cells are arranged in a three-dimensional configuration.

In an example, the data storage device 110 is attached to or embedded within the host device 105. In another example, the data storage device 110 is implemented as an external device or a portable device that can be communicatively or selectively coupled to, and removed from, the host device 105. In yet another example, the data storage device 110 is a component (e.g., a solid-state drive (SSD)) of a network accessible data storage system, a network-attached storage system, a cloud data storage system, or the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different memory dies may be logically linked together to form a metablock.

Figure 2A:
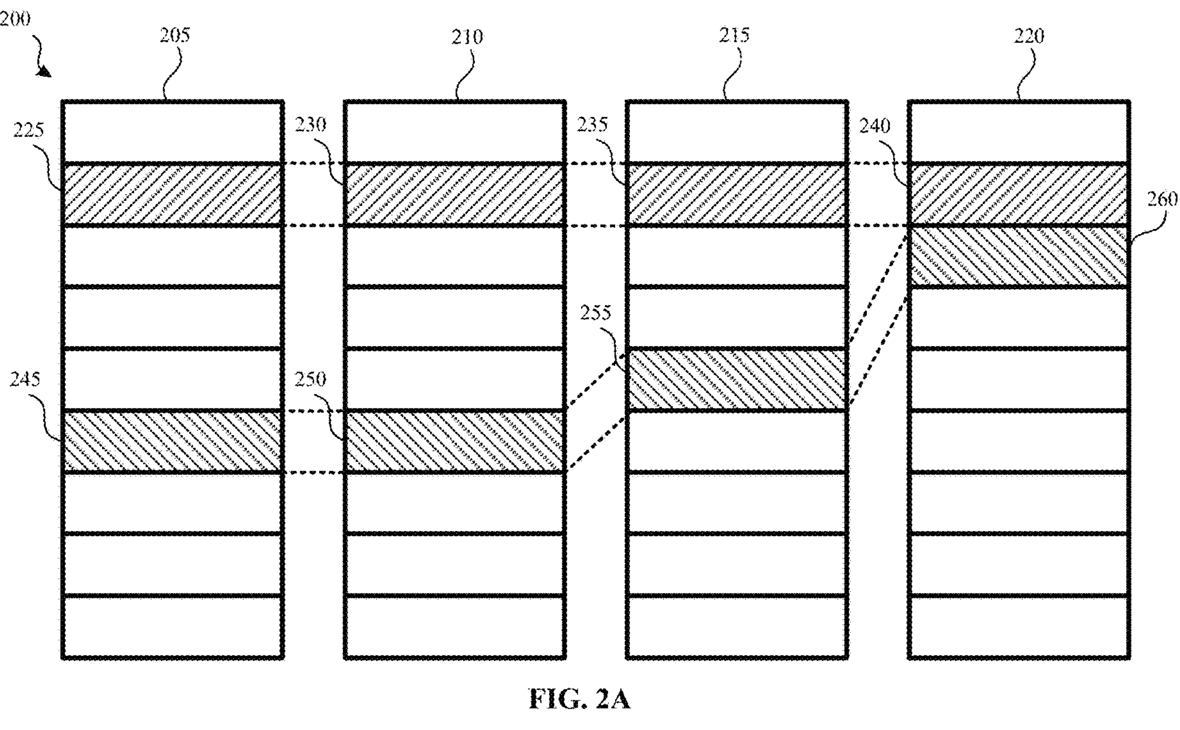
FIG. 2A illustrates how a memory device includes a number of memory blocks according to an example.

For example and referring to FIG. 2A, FIG. 2A illustrates how a memory device 200 includes a number of memory blocks according to an example. In this example, the memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die. In another example, the planes are provided on two different memory dies (e.g., two planes on each memory die). In yet another example, the planes are provided on four separate memory dies. Although four planes are shown and described, the memory device 200 may have any number of planes and/or memory dies.

In an example, each plane is divided into memory blocks consisting of memory cells. As shown in FIG. 2A, the rectangles represent a memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In an example and as will be described in greater detail herein, a memory block can also be divided into sub-blocks. For example, memory block 225 can be divided into a first sub-block and a second sub-block. In such an example, each sub-block will be associated with various physical wordlines and logical wordlines.

For example, if the memory block has 216 wordlines, the first sub-block will be comprised of physical wordlines 0-107 while the second sub-block will be comprised of physical wordlines 108-215. The first sub-block and the second sub-block are also associated with logical wordlines.

For example, the first sub-block and the second sub-block will be associated with logical wordline 0 through logical wordline 107. However, the numbering of the wordlines decreases from top to bottom in the first sub-block and increases from top to bottom in the second sub-block. For example, physical wordline 0 in the memory block corresponds to logical wordline 107 in the first sub-block and physical wordline 107 in the memory block corresponds to logical wordline 0 in the first sub-block.

The same is true for the second sub-block in the memory block. For example, physical wordline 108 in the memory block corresponds to logical wordline 0 in the second sub-block and physical wordline 215 in the memory block corresponds to logical wordlines 107 in the second sub-block. Although specific physical wordline numbers and logical wordline numbers are given, these are for example purposes only.

In an example, various memory blocks are logically linked or grouped together (e.g., using a table in or otherwise accessible by the controller 150 (FIG. 1)) to form a metablock. A metablock is written to, read from and/or erased as a single unit. For example, memory block 225, memory block 230, memory block 235 and memory block 240 form a first metablock while memory block 245, memory block 250, memory block 255 and memory block 260 form a second metablock. The memory blocks used to form a metablock need not be restricted to the same relative locations within their respective planes.

In examples in which memory blocks are divided into sub-blocks, due to the way in which the logical wordlines of each sub-block are mapped to the physical wordlines of the memory block, a first sub-block of one memory die (or of one plane of one memory die) can be linked to other first sub-blocks of other memory dies (or other planes of the same memory die) when forming a metablock. Likewise, second sub-blocks of one memory die can be linked to other second sub-blocks of other memory dies when forming a metablock.

Figure 2B:
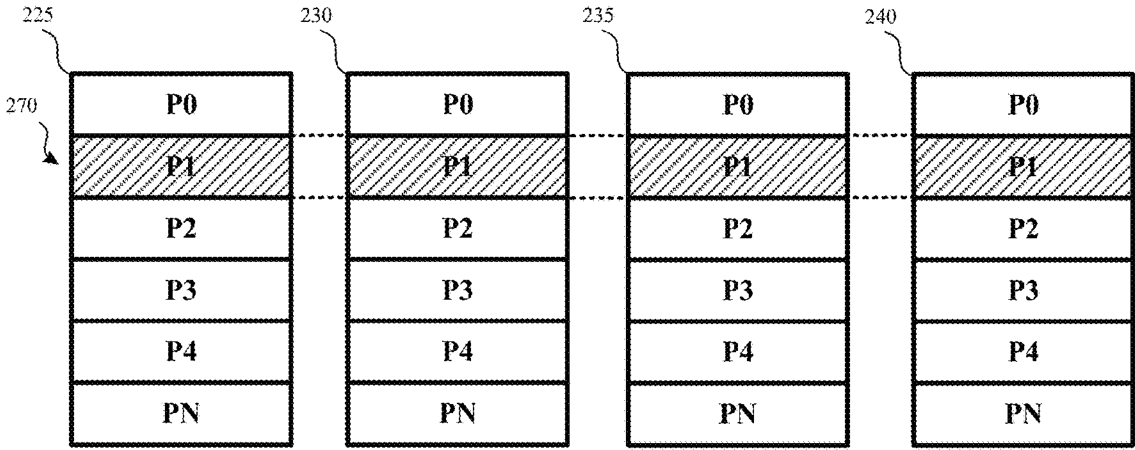
FIG. 2B illustrates how a memory block includes one or more pages according to an example.

In an example, each memory block is divided, for operational purposes, into pages of memory cells. For example and referring to FIG. 2B, FIG. 2B illustrates how a memory block includes one or more pages according to an example. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. For example, each page is further dividable into segments or units and each segment includes the fewest number of memory cells that may be written to at one time as a basic programming operation.

A metapage 270 is illustrated in FIG. 2B as being formed of one physical page from each of memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

As indicated above, each memory block may include any number of memory cells. The design, size, and organization of a memory block may depend on the architecture, design, and application desired for each memory die. In an example, the memory block includes a contiguous set of memory cells that share a plurality of wordlines and bit lines.

Figure 2C:
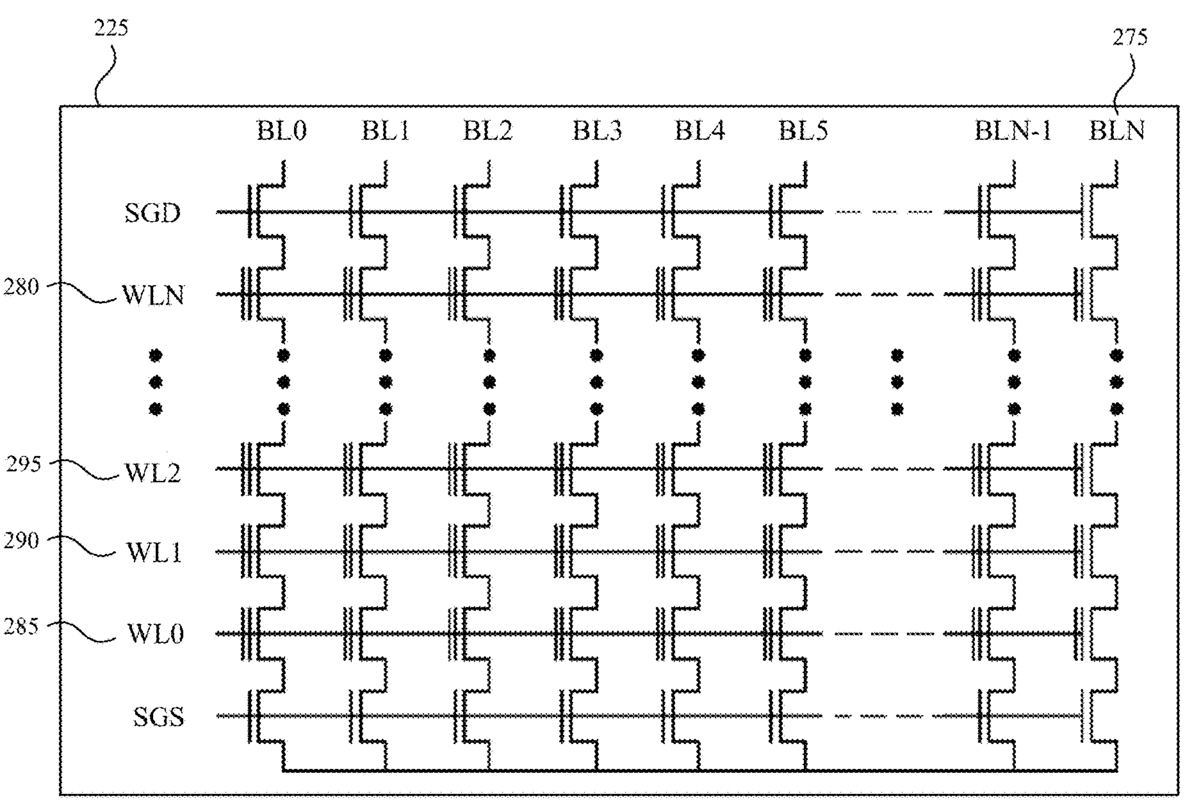
FIG. 2C illustrates how a memory block includes a number of bit lines and wordlines according to an example.

FIG. 2C illustrates how a memory block includes a number of bit lines 275 and wordlines 280 according to an example. For example and as shown in FIG. 2C, the memory block 225 includes bit lines BLO-BLN (collectively bit lines 275), where N is a total number of bit lines. Additionally, the memory block 225 includes wordlines WL0 285, WL1 290, WL2 295-WLN 280 (collectively wordlines 280), where N is a total number of wordlines. In an example, multiple memory blocks can share the same bit line.

A wordline 280 may function as a single-level-cell (SLC) wordline, a multi-level-cell (MLC) wordline, a tri-level-cell (TLC) wordline, a quad-level cell (QLC) wordline, a penta-level cell (PLC) wordline and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

Referring back to FIG. 1, as previously described, the data storage device 110 also includes a controller 150. Although a single controller 150 is shown and described, the data storage device 110 can include multiple controllers. In such an example, a first controller executes a first operation or set of operations and the second controller executes a second operation or set of operations. In an example, the first set of operations and the second set of operations are executed on the same memory dies. In other examples, the first set of operations is executed on a first memory die or a first set of memory dies and the second set of operations is executed on a second memory die or a second set of memory dies.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 sends data, and a corresponding write command, to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the one or more read commands specify the physical address of a portion of the memory device 155 at which the data is stored. The controller 150 also tracks the number of program/erase cycles or other programming operations that have been performed on or by the memory device and/or the memory dies of the memory device 155.

The controller 150 also includes, or is otherwise associated with, a memory block relinking system 180. In an example, the memory block relinking system 180 is a packaged functional hardware unit designed for use with other components/systems. In another example, the memory block relinking system 180 is a portion of a program code (e.g., software or firmware) executable by a processor or processing circuitry. In yet another example, the memory block relinking system 180 is a self-contained hardware and/or software component/system that interfaces with other components and/or systems. Although the memory block relinking system 180 is shown as being part of the controller 150, the memory block relinking system 180 may be separate from the controller 150.

In an example, the memory block relinking system 180 is operable to determine whether one or more sub-blocks of a memory block that have been identified as a grown bad block can be relinked to another sub-block of another memory block (or to another sub-block of another plane of the same memory block).

For example, the controller 150 and/or the memory block relinking system 180 may identify that one or more memory blocks (e.g., memory block 225 (FIG. 2A)) have grown bad and/or that one or more sub-blocks of one or more memory blocks have grown bad. In an example, a determination that one or more memory blocks, or one or more sub-blocks of the one or more memory blocks, have grown bad is based, at least in part, on detecting an uncorrectable error correction code (UECC) exception due to, for example, a program failure and/or an erase failure. In another example, the controller 150 and/or the memory block relinking system 180 identify that one or more memory blocks have gone bad based, at least in part, on a determination that a predetermined number of unselected sub-block disturb (USBD) cycles have been reached.

In an example, at the beginning of life, each sub-block of a memory block is valid or good. However, after one or more cycles (e.g., program/erase (P/E) cycles), one of the sub-blocks may experience a program failure or an erase failure. As a result, both sub-blocks are marked or are otherwise identified as grown bad blocks. To correct this, at least one sub-block (e.g., the sub-block that did not experience the program or erase failure) is checked to determine its pass/fail status. If it is determined sub-block is valid or salvageable, the sub-block is subsequently used for the formation of another metablock.

For example, when the controller 150 and/or the memory block relinking system 180 have identified one or more memory blocks that have grown bad, the memory block relinking system 180 determines whether any of the sub-blocks of any of the grown bad blocks are salvageable. For example, when a memory block has been identified or classified as a grown bad block, information corresponding to the memory block that has grown bad is stored in a list of grown bad blocks.

In an example, the information that is stored in the list of grown bad blocks includes identifying information about the memory block (or the sub-block) that has grown bad. This information includes, but is not limited to, a physical address of the memory block, information associated with the memory die on which the memory block is located, FIM information associated with memory block, an identification of a plane on which the memory block is located and so on. In some examples, the list of grown bad blocks, and/or the information included in the list of grown bad blocks, is stored as metadata 175.

To determine whether at least one sub-block of the memory block that was identified as a grown bad block is salvageable, the memory block relinking system 180 performs one or more operations on each sub-block of the grown bad block. For example, for each memory block in the list of grown bad blocks, the memory block relinking system 180 performs an erase operation on the first sub-block and/or performs a program operation on the first sub-block.

When the erase operation and the program operation have been performed on the first sub-block, the memory block relinking system 180 determines whether the operations were successful. If the memory block relinking system 180 determines the operations were unsuccessful, the first sub-block of that particular memory block is retired.

However, if the memory block relinking system 180 determines the operations were successful, the memory block relinking system 180 accesses and/or stores identification information (e.g., address, FIM, die information, plane information) associated with the sub-block. In an example, this information is stored as metadata 175. This process repeats for each first sub-block in the list of grown bad blocks.

When all of the first sub-blocks of all of the memory blocks in the list of grown bad blocks have been analyzed by the memory block relinking system 180, similar operations are performed on the second sub-block of each memory block in the list of grown bad blocks. For example, for each memory block in the list of grown bad blocks, the memory block relinking system 180 performs an erase operation on the second sub-block and/or performs a program operation on the second sub-block.

When the erase operation and the program operation have been performed on the second sub-block, the memory block relinking system 180 determines whether the operations were successful. If the memory block relinking system 180 determines the operations were unsuccessful, the second sub-block of that particular memory block is retired.

However, if the memory block relinking system 180 determines the operations were successful, the memory block relinking system 180 accesses and/or stores identification information (e.g., address, FIM, die information, plane information) associated with the second sub-block. In an example, this information is stored as metadata 175. This process repeats for each second sub-block in the list of grown bad blocks.

The memory block relinking system 180 will now have a list of valid first sub-blocks and a list of valid second sub-blocks. Using the address information of each of the valid first sub-blocks, the memory block relinking system 180 logically links two or more of the valid first sub-blocks together to form a metablock. In an example, the memory block relinking system 180 will only logically link first sub-blocks that are associated with memory blocks that have grown bad. For example, the memory block relinking system 180 will only logically link first sub-blocks of memory blocks that were on the list of grown bad blocks. In other examples, first sub-blocks on which the erase and program operations have been successfully performed may be logically linked with first sub-blocks that have not been identified as grown bad blocks.

The memory block relinking system 180 also logically links two or more of the valid second sub-blocks together to form another metablock. In an example, the memory block relinking system 180 will only logically link second sub-blocks that are associated with memory blocks that have grown bad such as previously described. In other examples, second sub-blocks that have been salvaged may be logically linked with second sub-blocks that did not undergo a salvage operation.

In an example, the memory block relinking system 180 performs the memory block relinking process based on one or more operating conditions of the data storage device 110 and/or the memory device 155. For example, the memory block relinking system 180 will perform the relinking process after a threshold number of P/E cycles associated with a particular memory block and/or memory die has been reached. In another example, the memory block relinking process will be performed based on current or anticipated workload conditions. In yet another example, the memory block relinking process will be initiated after a threshold capacity (or a threshold amount of available space) has been reached.

Figure 3:
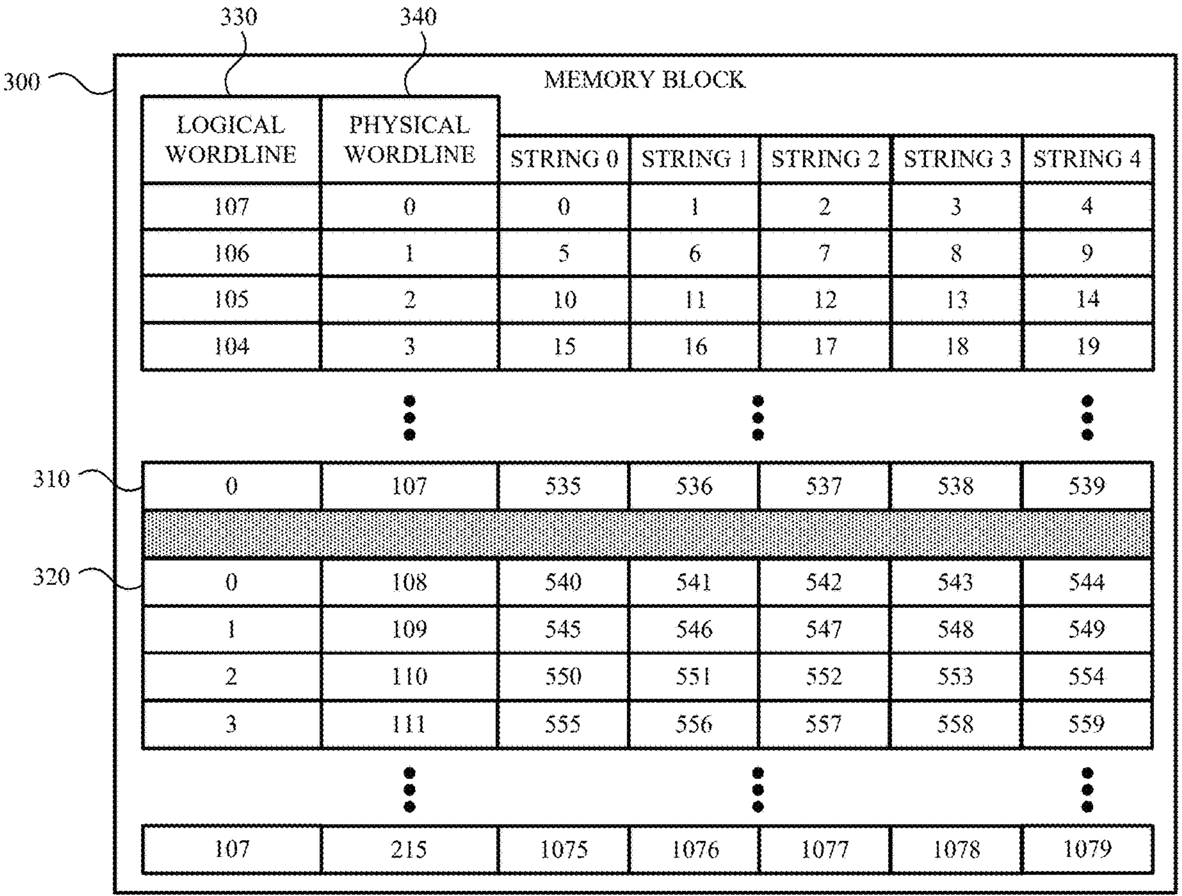
FIG. 3 illustrates how a memory block of a data storage device is divided into two sub-blocks according to an example.

FIG. 3 illustrates how a memory block 300 of a data storage device is divided into two sub-blocks according to an example. In an example, the memory block 300 is part of a memory die (e.g., the first memory die 165 (FIG. 1)) of a memory device (e.g., the memory device 155 (FIG. 1)) that is associated with the data storage device (e.g., the data storage device 110 (FIG. 1)).

In the example shown, the memory block 300 includes two-hundred sixteen physical wordlines 340 numbered from 0-215. In this example, the memory block 300 is divided into a first sub-block 310 and a second sub-block 320. The first sub-block 310 is associated with physical wordlines 240 0-107 and the second sub-block 320 is associated with physical wordlines 108-215. Although two sub-blocks are shown and described, the memory block 300 can be divided into more than two sub-blocks. Additionally, although each sub-block is associated with particular physical wordlines 340, this is for example purposes only.

In addition to being associated with physical wordlines 340, each sub-block is also associated with logical wordlines 330. For example, the first sub-block 310 is associated with logical wordlines 0-107 and the second sub-block 320 is also associated with logical wordlines 0-107. However, the logical wordlines 330 associated with the first sub-block 310 are in descending order while the logical wordlines 330 associated with the second sub-block 320 are in ascending order.

For example, physical wordline 0 of the first sub-block 310 is associated with logical wordline 107 of the first sub-block 310 and physical wordline 107 of the first sub-block 310 is associated with logical wordline 0 of the first sub-block 310. However, physical wordline 108 of the second sub-block 320 is associated with logical wordline 0 of the second sub-block 320 and physical wordline 215 of the second sub-block 320 is associated with logical wordline 107 of the second sub-block 320.

In an example, and due to the way that logical wordlines 330 are mapped to physical wordlines 340 of each sub-block, first sub-blocks are logically linked (e.g., during metablock formation) with other first sub-blocks of other memory blocks (e.g., other memory blocks on other planes and/or other memory dies). Likewise, second sub-blocks are logically linked (e.g., during metablock formation) with other second sub-blocks of other memory blocks (e.g., other memory blocks on other planes and/or other memory dies).

In an example, the memory block 300 is identified as a grown bad block. For example, at least one of the first sub-block 310 or the second sub-block 320 has failed a program operation, an erase operation, has reached a threshold number of P/E cycles, or is party to an UECC condition. As such, the memory block is added to a list of grown bad blocks (e.g., the list of grown bad blocks 400 (FIG. 4)). The memory block relinking system (e.g., the memory block relinking system 180 (FIG. 1)) accesses the list and determines whether the first sub-block 310 and/or the second sub-block is salvageable and can subsequently be relinked to other sub-blocks to form a metablock.

Figure 4:
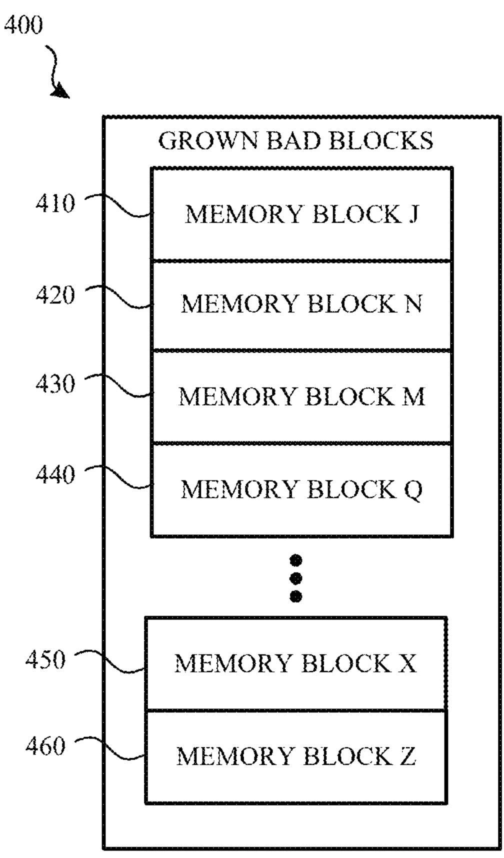
FIG. 4 illustrates a list of grown bad blocks according to an example.

FIG. 4 illustrates a list of grown bad blocks 400 according to an example. The list of grown bad blocks 400 includes a list of memory blocks that have been identified, classified or otherwise marked as having grown bad. For example, each memory block in the list of grown bad blocks 400 has at least one sub-block that has grown bad. In an example, the list of grown bad blocks 400 is maintained by a memory block relinking system (e.g., the memory block relinking system 180 (FIG. 1)).

In the example shown in FIG. 4, the list of grown bad blocks 400 includes six entries-Memory Block J 410, Memory Block N 420, Memory Block M 430, Memory Block Q 440, Memory Block X 450 and Memory Block Z 460. Although six entries are shown, the list of grown bad blocks 400 may include any number of entries.

In an example, the memory block relinking system accesses the list of grown bad blocks 400 to determine whether any sub-blocks associated with each memory block in the list of grown bad blocks 400 are salvageable and/or can be marked/identified as relinking candidates.

In an example, the memory block relinking system initiates the determination when a number of entries in the list of grown bad blocks 400 exceeds a threshold. In another example, the memory block relinking system initiates the determination based on an operating state of a data storage device. For example, a frequency at which the determination is made is based, at least in part, on available capacity of the data storage device, an amount of data stored by the data storage device, an amount of time that has elapsed since a previous determination has been executed, the number and/or types of operations that have been executed on the data storage device, the number of P/E cycles executed on the data storage device, a current or anticipated workload of the data storage device and so on.

To determine whether any sub-blocks of each memory block in the list of grown bad blocks 400 is salvageable, the memory block relinking system executes one or more operations on each sub-block of each memory block in the list of grown bad blocks 400. For example, the memory block relinking system executes an erase operation followed by a program operation on the first sub-block of Memory Block J 410, the first sub-block of Memory Block N 420, the first sub-block of Memory Block M 430, the first sub-block of Memory Block Q 440, the first sub-block of Memory Block X 450 and the first sub-block of Memory Block Z 460.

If the operations fail, the first sub-block of a particular memory block is marked as retired. However, if the operations are successful, the first sub-block of the particular memory block is marked or identified as a relinking candidate.

Figures 5A, 5B:
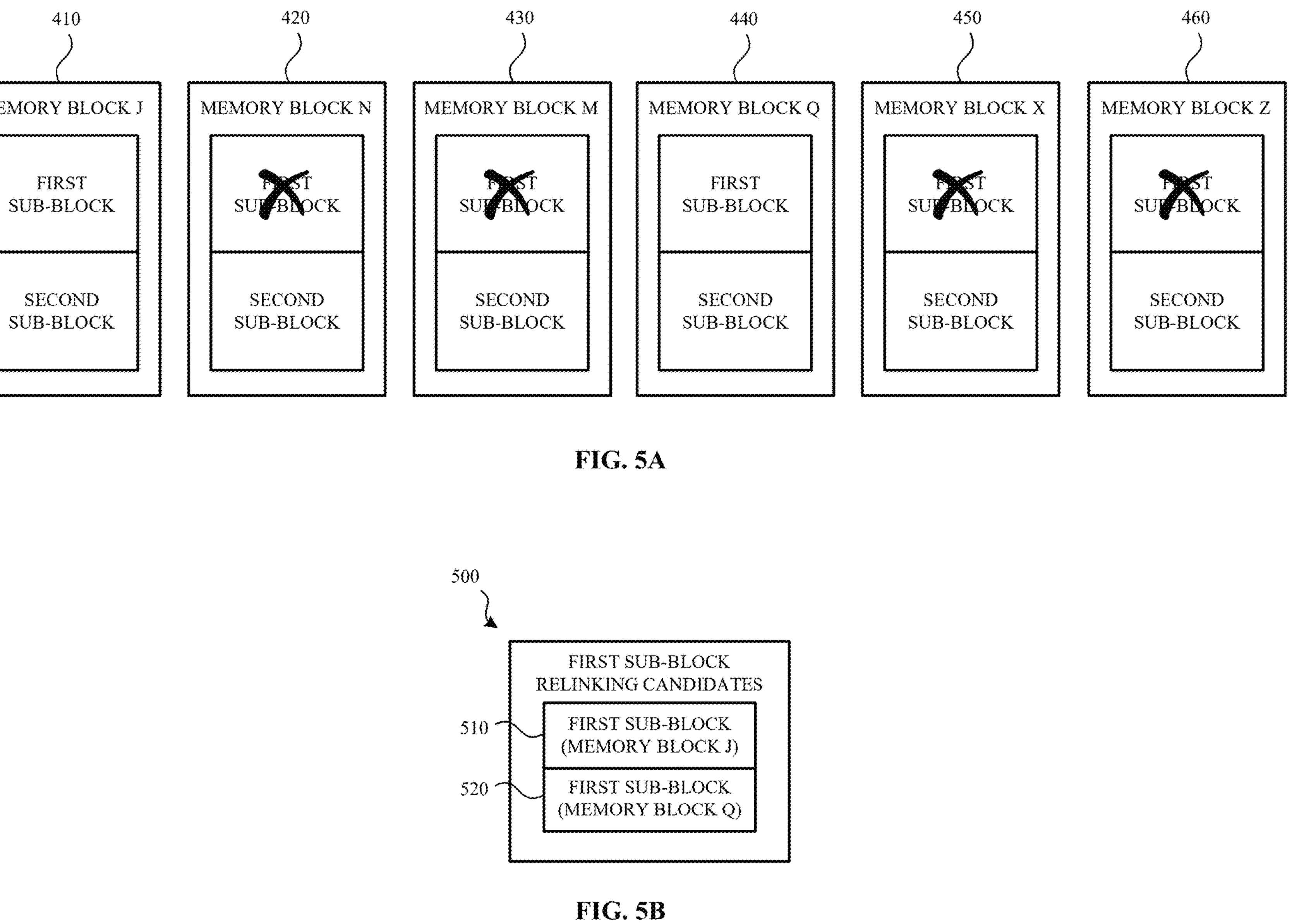
FIG. 5A illustrates how first sub-blocks of various memory blocks in the list of grown bad blocks of FIG. 4 have either passed or failed various operations executed by a memory block relinking system according to an example.
FIG. 5B illustrates how the memory block relinking system identifies a first sub-block of a memory block as a relinking candidate according to an example.

FIG. 5A illustrates how first sub-blocks of various memory blocks in the list of grown bad blocks 400 of FIG. 4 have either passed or failed various operations executed by a memory block relinking system according to an example. As shown in FIG. 5A, the operations executed on the first sub-block of Memory Block J 410 and the first sub-block of Memory Block Q 440 were successful. However, the operations executed on the first sub-block of Memory Block N 420, the first sub-block of Memory Block M 430, the first sub-block of Memory Block X 450 and the first sub-block of Memory Block Z 460 were unsuccessful.

As such, the first sub-block of Memory Block N 420, the first sub-block of Memory Block M 430, the first sub-block of Memory Block X 450 and the first sub-block of Memory Block Z 460 are retired (indicated by the X). However, the first sub-block of Memory Block J 410 and the first sub-block of Memory Block Q 440 are identified as relinking candidates.

FIG. 5B illustrates how the memory block relinking system identifies a first sub-block of a memory block as a relinking candidate according to an example. Because the operations executed on the first sub-block of Memory Block J 410 and the first sub-block of Memory Block Q 440 were successful, the memory block relinking system adds address information (or other identifying information) to a list of first sub-block relinking candidates 500. For example and as shown in FIG. 5B, address information associated with the first sub-block 510 of Memory Block J 410 and the first sub-block 520 of Memory Block Q 440 are added to the list of first sub-block relinking candidates 500. As such, the first sub-block 510 of Memory Block J 410 and the first sub-block 520 of Memory Block Q 440 can be used to form a metablock.

Referring back to FIG. 4, the memory block relinking system also determines whether any of the second sub-blocks of each memory block in the list of grown bad blocks 400 is salvageable. For example, the memory block relinking system executes an erase operation followed by a program operation on the second sub-block of Memory Block J 410, the second sub-block of Memory Block N 420, the second sub-block of Memory Block M 430, the second sub-block of Memory Block Q 440, the second sub-block of Memory Block X 450 and the second sub-block of Memory Block Z 460.

If one or more of the operations fail, the second sub-block is marked as retired. However, if the operations are successful, the second sub-block is marked or identified as a relinking candidate.

Figures 6A, 6B:
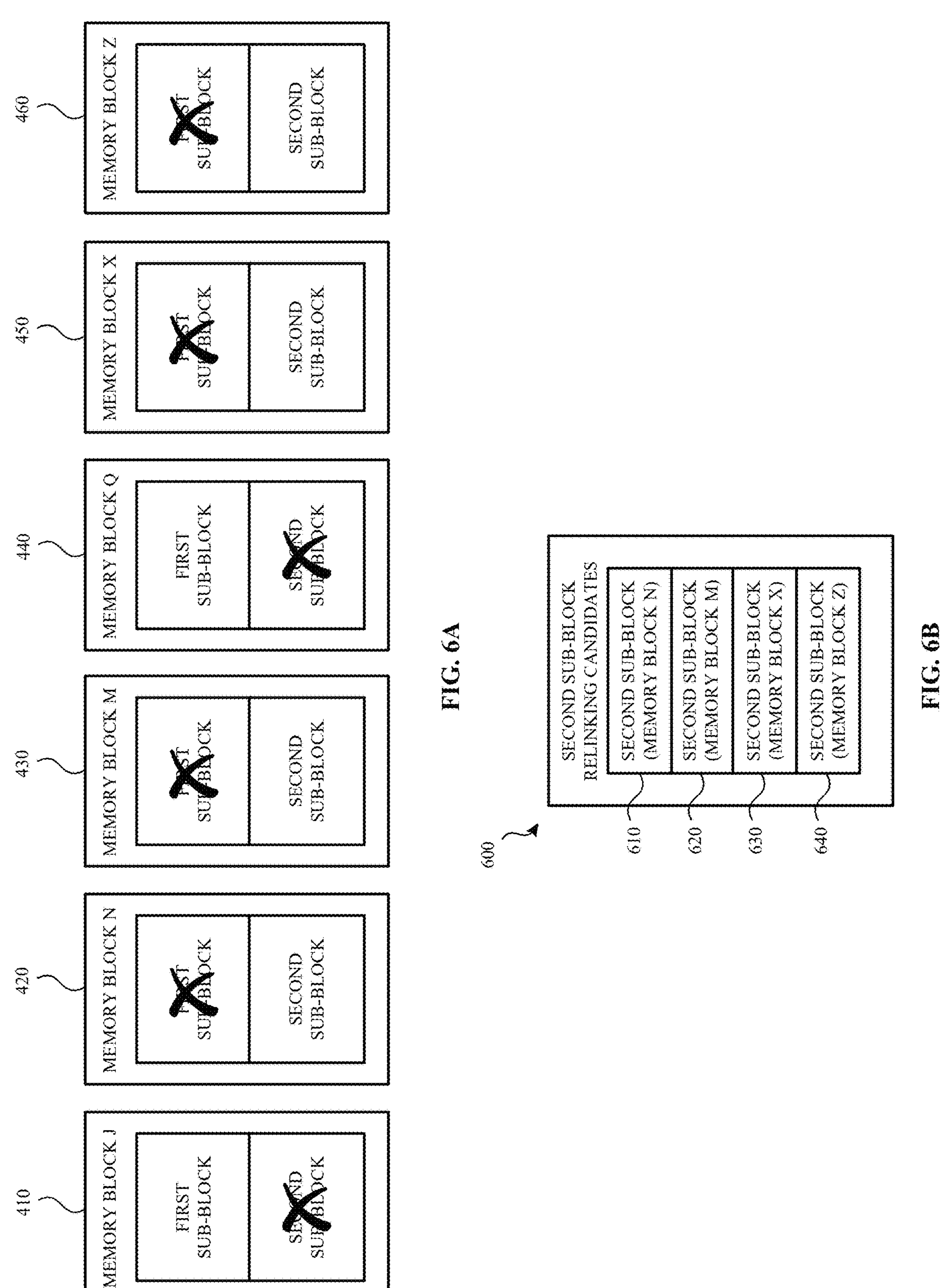
FIG. 6A illustrates how second sub-blocks of various memory blocks in the list of grown bad blocks of FIG. 4 have either passed or failed various operations executed by a memory block relinking system according to an example.
FIG. 6B illustrates how the memory block relinking system identifies a second sub-block of a memory block as a relinking candidate according to an example.

FIG. 6A illustrates how second sub-blocks of various memory blocks in the list of grown bad blocks 400 of FIG. 4 have either passed or failed various operations executed by a memory block relinking system according to an example. In the example shown in FIG. 6A, the operations executed on the second sub-block of Memory Block J 410 and the second sub-block of Memory Block Q 440 were unsuccessful. As such, these sub-blocks are marked as retired.

However, the operations executed on the second sub-block of Memory Block N 420, the second sub-block of Memory Block M 430, the second sub-block of Memory Block X 450 and the second sub-block of Memory Block Z 460 were successful. As such, these sub-blocks are identified as relinking candidates.

For example and referring to FIG. 6B, FIG. 6B illustrates how the memory block relinking system identifies a second sub-block of a memory block as a relinking candidate according to an example. Because the operations executed on the second sub-block of Memory Block N 420, the second sub-block of Memory Block M 430, the second sub-block of Memory Block X 450 and the second sub-block of Memory Block Z 460 were successful, the memory block relinking system adds address information (or other identifying information) to a list of second sub-block relinking candidates 600.

For example and as shown in FIG. 6B, address information associated with the second sub-block 610 of Memory Block N 420, the second sub-block 620 of Memory Block M 430, the second sub-block 630 of Memory Block X 450 and the second sub-block 640 of Memory Block Z 460 were successful are added to the list of second sub-block relinking candidates 600. As such, these memory block may be used to form a new metablock.

Figure 7:
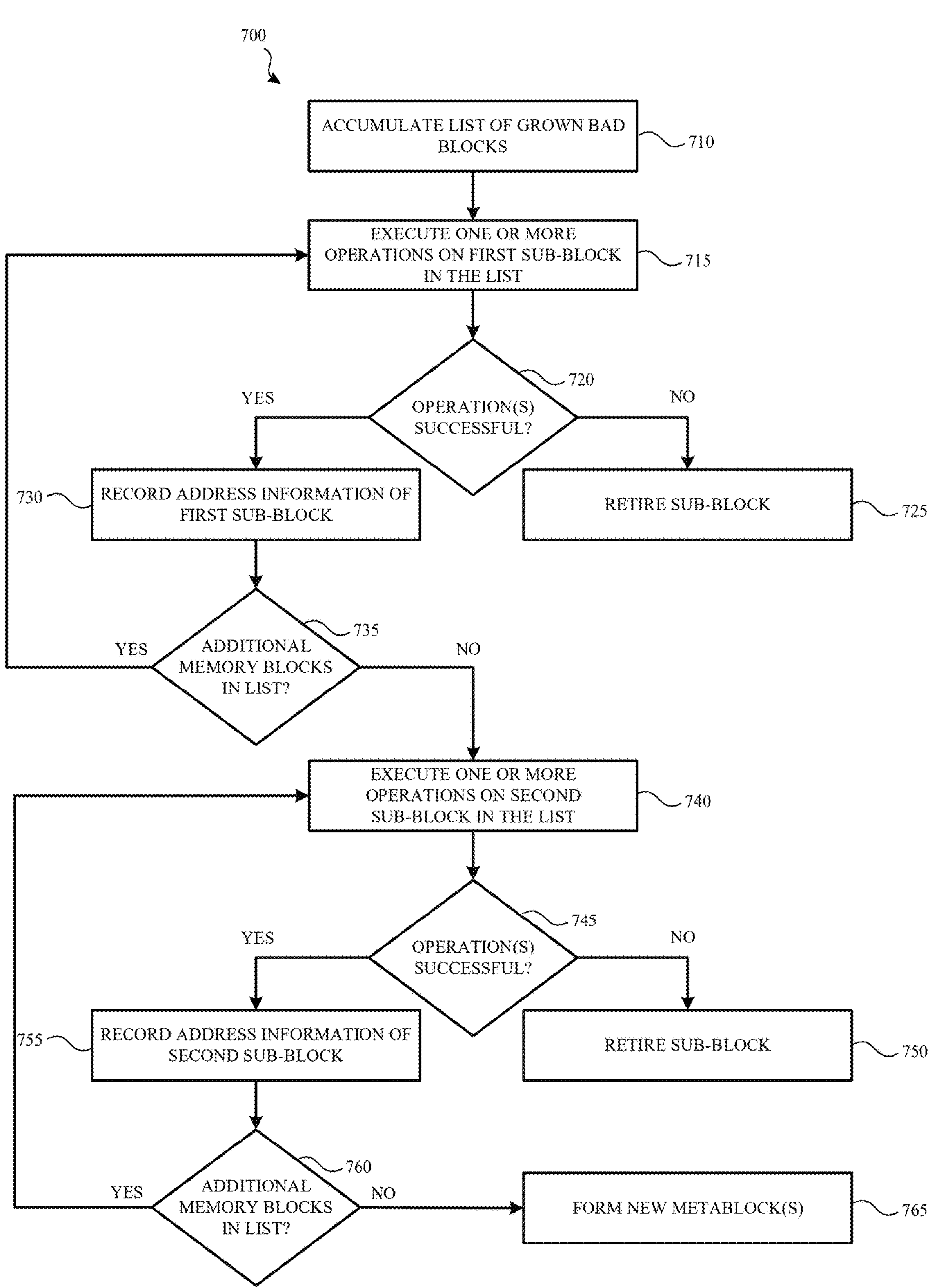
FIG. 7 illustrates a method for determining whether a sub-block of a grown bad block is a relinking candidate according to an example.

FIG. 7 illustrates a method 700 for determining whether a sub-block of a grown bad block is a relinking candidate according to an example. In an example, the method 700 is executed by a memory block relinking system (e.g., the memory block relinking system 180 (FIG. 1)) of a data storage device (e.g., the data storage device 110 (FIG. 1)).

Method 700 begins when a list of grown bad blocks is accumulated (710). In an example, each time a memory block is identified as a grown bad block, identifying information (e.g., address information) of the memory block is added to a list of grown bad blocks (e.g., the list of grown bad blocks 400 (FIG. 4)).

Based, at least in part, on the list of grown bad blocks having one or more entries, the memory block relinking system executes (715) one or more operations on a first sub-block of a first memory block in the list of grown bad blocks. In an example, the one or more operations is an erase operation. In another example, the one or more operations is a program operation. In yet another example, an erase operation is executed on the first sub-block followed by a program operation. Although an erase operation and program operation are specifically mentioned, other operations may be performed on the first sub-block.

When the one or more operations have been performed on the first sub-block of the first memory block in the list of grown bad blocks, the memory block relinking system determines (715) whether the one or more operations were successful. If the memory block relinking system determines (715) the one or more operations were unsuccessful, the first sub-block of the first memory block in the list of grown bad blocks is retired (725).

However, if the memory block relinking system determines (715) the one or more operations were successful, address information (or other identifying information) associated with the first sub-block of the first memory block in the list of grown bad blocks is recorded (730) and the first sub-block of the first memory block in the list of grown bad blocks is identified as a relinking candidate. For example, address information associated with the first sub-block of the first memory block in the list of grown bad blocks is added to a list of first sub-block relinking candidates (e.g., the list of first sub-block relinking candidates 500 (FIG. 5B)).

The memory block relinking system also determines (735) whether there are additional memory blocks in the list of grown bad blocks. If the memory block relinking system determines (735) there are additional memory blocks in the list of grown bad blocks, the operations described above are repeated. For example, the memory block relinking system executes the same or similar operations on a first sub-block of a second memory block in the list of grown bad blocks. However, if the memory block relinking system determines (735) that there are no additional memory blocks in the list of grown bad blocks (e.g., the first sub-blocks of each memory block in the list of grown bad blocks have been analyzed), the memory block relinking system executes (745) one or more operations on the second sub-block of the first memory block in the list of grown bad blocks.

In an example, the one or more operations executed on the second sub-block of the first memory block in the list of grown bad blocks is an erase operation. In another example, the one or more operations is a program operation. In yet another example, an erase operation is executed on the second sub-block of the first memory block in the list of grown bad blocks followed by a program operation. Although an erase operation and program operation are specifically mentioned, other operations may be performed on the second sub-block.

When the one or more operations have been performed on the second sub-block of the first memory block in the list of grown bad blocks, the memory block relinking system determines (745) whether the one or more operations were successful. If the memory block relinking system determines (745) the one or more operations were unsuccessful, the second sub-block of first memory block in the list of grown bad blocks is retired (750).

However, if the memory block relinking system determines (745) the one or more operations were successful, address information (or other identifying information) associated with the second sub-block of the first memory block in the list of grown bad blocks is recorded (755) and the second sub-block of the first memory block in the list of grown bad blocks is identified as a relinking candidate. For example, address information associated with the second sub-block of the first memory block in the list of grown bad blocks is added to a list of second sub-block relinking candidates (e.g., the list of second sub-block relinking candidates 600 (FIG. 6B)).

The memory block relinking system also determines (760) whether there are additional memory blocks in the list of grown bad blocks. If the memory block relinking system determines (760) there are additional memory blocks in the list of grown bad blocks, the operations described above with respect to a second sub-block of the second memory block in the list of grown bad blocks are repeated. However, if the memory block relinking system determines (760) that there are not additional memory blocks in the list of grown bad blocks (e.g., the second sub-blocks of each memory block in the list of grown bad blocks have been analyzed), the memory block relinking system forms (765) new meta-blocks using the first sub-block relinking candidates and/or using the second sub-block relinking candidates.

In an example, when forming new metablocks, the memory block relinking system determines or identifies one or more metrics associated with each of the sub-block relinking candidates. When the one or more metrics are identified, the memory block relinking system may use the one or more metrics when determining which sub-block relinking candidates should be linked.

For example, the memory block relinking system may identify a number of P/E cycles associated with each sub-block relinking candidate and link sub-blocks with other sub-blocks that have similar number (or within a threshold number) of P/E cycles. In another example, the memory block relinking system may link sub-blocks with other sub-blocks that are on the same memory die or different memory dies. Although specific metrics are mentioned, other metrics may be used to determine which sub-blocks relinking candidates can and/or should be relinked with other sub-block relinking candidates.

Figures 8, 9:
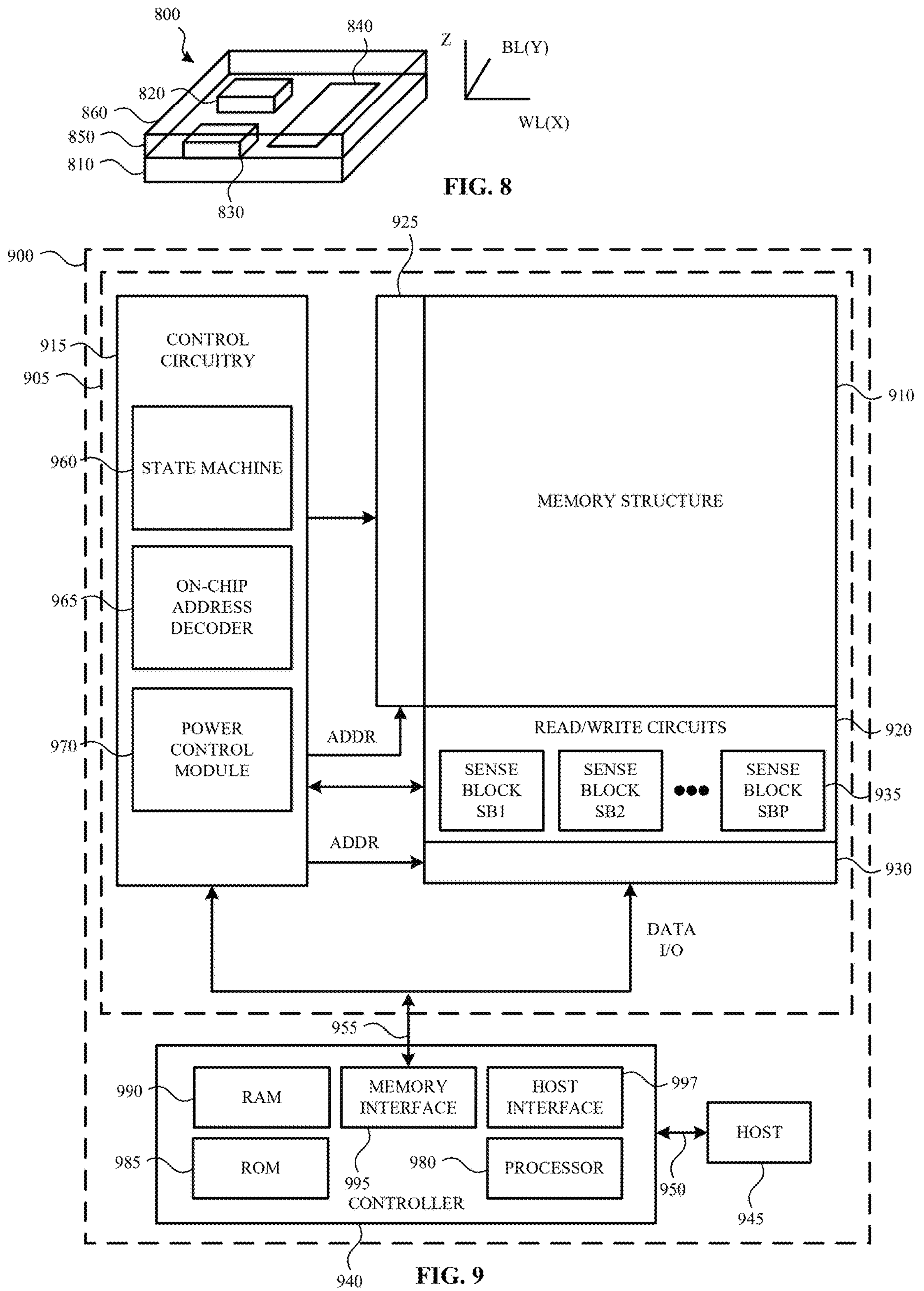
FIG. 8 is a perspective view of a storage device that includes three-dimensional (3D) stacked non-volatile memory according to an example.
FIG. 9 is a block diagram of a storage device according to an example.

FIG. 8-FIG. 9 describe example storage devices that may be used with or otherwise implement the various features described herein. For example, the storage devices shown and described with respect to FIG. 8-FIG. 9 may include various systems and components that are similar to the systems and components shown and described with respect to FIG. 1. For example, the controller 940 shown and described with respect to FIG. 9 may be similar to the controller 150 of FIG. 1. Likewise, the memory dies 905 may be similar to the first memory die 165 and/or the second memory die 170 of FIG. 1.

FIG. 8 is a perspective view of a storage device 800 that includes three-dimensional (3D) stacked non-volatile memory according to an example. In this example, the storage device 800 includes a substrate 810. Blocks of memory cells are included on or above the substrate 810. The blocks include a first block (BLK0 820) and a second block (BLK1 830). Each block is formed of memory cells (e.g., non-volatile memory elements). The substrate 810 also includes a peripheral area 840 having support circuits that are used by the first block and the second block.

The substrate 810 also carries circuits under the blocks, along with one or more lower metal layers which are patterned in conductive paths to carry signals from the circuits. In an example, the blocks are formed in an intermediate region 850 of the storage device 800. The storage device also includes an upper region 860. The upper region 860 includes one or more upper metal layers that are patterned in conductive paths to carry signals from the circuits. Each block of memory cells includes a stacked area of memory cells. In an example, alternating levels of the stack represent wordlines. While two blocks are depicted, additional blocks may be used and extend in the x-direction and/or the y-direction.

In an example, a length of a plane of the substrate 810 in the x-direction represents a direction in which signal paths for wordlines or control gate lines extend (e.g., a wordline or drain-end select gate (SGD) line direction) and the width of the plane of the substrate 810 in the y-direction represents a direction in which signal paths for bit lines extend (e.g., a bit line direction). The z-direction represents a height of the storage device 800.

FIG. 9 is a functional block diagram of a storage device 900 according to an example. In an example, the storage device 900 is similar to the 3D stacked non-volatile storage device 800 shown and described with respect to FIG. 8. In an example, the components depicted in FIG. 9 are electrical circuits. In an example, the storage device 900 includes one or more memory dies 905. Each memory die 905 includes a three-dimensional memory structure 910 of memory cells (e.g., a 3D array of memory cells), control circuitry 915, and read/write circuits 920. In another example, a two-dimensional array of memory cells may be used. The memory structure 910 is addressable by wordlines using a first decoder 925 (e.g., a row decoder) and by bit lines using a second decoder 930 (e.g., a column decoder). The read/write circuits 920 may also include multiple sense blocks 935 including SB1, SB2, . . . , SBp (e.g., sensing circuitry) which allow pages of the memory cells to be read or programmed in parallel. The sense blocks 935 may include bit line drivers.

In an example, a controller 940 is included in the same storage device 900 as the one or more memory dies 905. In another example, the controller 940 is formed on a die that is bonded to a memory die 905, in which case each memory die 905 may have its own controller 940. In yet another example, a controller die controls all of the memory dies 905. Although a single controller 940 is shown, the storage device 900 can include multiple controllers with each controller responsible for different operations described herein.

Commands and data are transferred between a host 945 and the controller 940 using a data bus 950. Additionally, commands and data are transferred between the controller 940 and one or more of the memory dies 905 by way of lines 955. In one example, the memory die 905 includes a set of input and/or output (I/O) pins that connect to lines 955.

The memory structure 910 also includes one or more arrays of memory cells. The memory cells are arranged in a three-dimensional array or a two-dimensional array. The memory structure 910 includes any type of non-volatile memory that is formed on one or more physical levels of arrays of memory cells having an active area disposed above a silicon substrate. The memory structure 910 may be in a non-volatile memory device having circuitry associated with the operation of the memory cells, whether the associated circuitry is above or within the substrate.

The control circuitry 915 works in conjunction with the read/write circuits 920 to perform memory operations (e.g., erase, program, read, and others) on the memory structure 910. The control circuitry 915 may include registers, ROM fuses, and other devices for storing default values such as base voltages and other parameters.

The control circuitry 915 also includes a state machine 960, an on-chip address decoder 965 and a power control module. The state machine 960 provides chip-level control of various memory operations, such as selecting a memory block for programming. The state machine 960 is programmable by software. In another example, the state machine 960 does not use software and is completely implemented in hardware (e.g., electrical circuits).

The on-chip address decoder 965 provides an address interface between addresses used by host 945 and/or the controller 940 to a hardware address used by the first decoder 925 and the second decoder 930. The power control module 970 controls power and voltages that are supplied to the wordlines and bit lines during memory operations. The power control module 970 may include drivers for wordline layers in a 3D configuration, select transistors (e.g., SGS and SGD transistors) and source lines. The power control module 970 may include one or more charge pumps for creating voltages.

The control circuitry 915, the state machine 960, the on-chip address decoder 965, the first decoder 925, the second decoder 930, the power control module 970, the sense blocks 935, the read/write circuits 920, and/or the controller 940 may be considered one or more control circuits and/or a managing circuit that perform some or all of the operations described herein.

In an example, the controller 940, is an electrical circuit that may be on-chip or off-chip. Additionally, the controller 940 may include one or more processors 980, ROM 985, RAM 990, memory interface 995, and host interface 997, all of which may be interconnected. In an example, the one or more processors 980 is one example of a control circuit. Other examples can use state machines or other custom circuits designed to perform one or more functions. Devices such as ROM 985 and RAM 990 may include code such as a set of instructions. One or more of the processors 980 may be operable to execute the set of instructions to provide some or all of the functionality described herein.

Alternatively or additionally, one or more of the processors 980 may access code from a memory device in the memory structure 910, such as a reserved area of memory cells connected to one or more wordlines. The memory interface 995, in communication with ROM 985, RAM 990, and one or more of the processors 980, may be an electrical circuit that provides an electrical interface between the controller 940 and the memory die 905. For example, the memory interface 995 may change the format or timing of signals, provide a buffer, isolate from surges, latch I/O, and so forth.

The one or more processors 980 may issue commands to control circuitry 915, or any other component of memory die 905, using the memory interface 995. The host interface 997, in communication with the ROM 985, the RAM 990, and the one or more processors 980, may be an electrical circuit that provides an electrical interface between the controller 940 and the host 945. For example, the host interface 997 may change the format or timing of signals, provide a buffer, isolate from surges, latch I/O, and so on. Commands and data from the host 945 are received by the controller 940 by way of the host interface 997. Data sent to the host 945 may be transmitted using the data bus 950.

Multiple memory elements in the memory structure 910 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

In accordance with the above, examples of the present disclosure describe a method, comprising: identifying one or more memory blocks in a list of grown bad blocks, each of the one or more memory blocks in the list of grown bad blocks being divided into a first sub-block and a second sub-block; executing an operation on the first sub-block of a first memory block of the one or more memory blocks; determining whether the operation on the first sub-block of the first memory block is successful; and based, at least in part, on determining the operation on the first sub-block of the first memory block is successful, identifying the first sub-block of the first memory block as a sub-block relinking candidate. In an example, the method also includes logically linking the first sub-block of the first memory block to a first sub-block of a second memory block, the first sub-block of the second memory block having been identified as a sub-block relinking candidate. In an example, the first sub-block of the first memory block and the first sub-block of the second memory block form at least a portion of a metablock when the first sub-block of the first memory block is logically linked to the first sub-block of the second memory block. In an example, the method also includes recording address information associated with the first sub-block of the first memory block. In an example, the method also includes retiring the first sub-block of the first memory block based, at least in part, on determining the operation on the first sub-block of the first memory block is unsuccessful. In an example, the operation on the first sub-block of the first memory block is at least one of a program operation and an erase operation. In an example, the method also includes executing an operation on the second sub-block of the first memory block of the one or more memory blocks; determining whether the operation on the second sub-block of the first memory block is successful; and based, at least in part, on determining the operation on the second sub-block of the first memory block is successful, identifying the second sub-block of the first memory block as a sub-block relinking candidate. In an example, the method also includes logically linking the second sub-block of the first memory block to a second sub-block of a second memory block, the second sub-block of the second memory block having been identified as a sub-block relinking candidate. In an example, the operation on the second sub-block of the first memory block is at least one of a program operation and an erase operation.

Examples also describe a data storage device, comprising: a controller; and a memory block relinking system associated with the controller, the memory block relinking system operable to: execute at least one operation on at least one of a first sub-block and a second sub-block of a memory block that has been identified as a grown bad block; identify the at least one of the first sub-block and the second sub-block of the memory as a relinking candidate based, at least in part, on a determination that the at least one operation that was executed on the at least one of the first sub-block and the second sub-block successful; and logically link the at least one of the first sub-block and the second sub-block to a corresponding sub-block of another memory block that was identified as a grown bad block. In an example, the operation is at least one of a program operation and an erase operation. In an example, the memory block relinking system is further operable to retire the at least one of the first sub-block and the second sub-block of the memory block based, at least in part, on a determination that the execution of the at least one operation is unsuccessful. In an example, logically linking the at least one of the first sub-block and the second sub-block to a corresponding sub-block of another memory block forms at least a portion of a metablock. In an example, a frequency of identifying the at least one of the first sub-block and the second sub-block of the memory block as a relinking candidate is based, at least in part, on an operating state of the data storage device. In an example, the memory block relinking system is further operable to: identify one or more metrics associated with the at least one of the first sub-block and the second sub-block; and logically link the at least one of the first sub-block and the second sub-block to the corresponding sub-block of the another memory block based, at least in part, on the one or more metrics.

Examples also describe a data storage device, comprising: means for executing an operation on a first sub-block of a first memory block of one or more memory blocks that have been identified as a grown bad block; means for determining whether the operation on the first sub-block of the first memory block is successful; and means for identifying the first sub-block of the first memory block as a sub-block relinking candidate based, at least in part, on a determination that the operation on the first sub-block of the first memory block is successful. In an example, the data storage device also includes means for logically linking the first sub-block of the first memory block to a first sub-block of a second memory block, the first sub-block of the second memory block having been identified as a sub-block relinking candidate. In an example, the data storage device also includes means for recording address information associated with the first sub-block of the first memory block. In an example, the data storage device also includes means for retiring the first sub-block of the first memory block based, at least in part, on a determination that the operation on the first sub-block of the first memory block is unsuccessful. In an example, the operation on the first sub-block of the first memory block is at least one of a program operation and an erase operation The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

identifying one or more memory blocks in a list of grown bad blocks, each of the one or more memory blocks in the list of grown bad blocks being divided into a first sub-block and a second sub-block, the first sub-block being associated with a first ordinal range of physical wordlines and the second sub-block being associated with a second ordinal range of physical wordlines;

executing an operation on the first sub-block of a first memory block of the one or more memory blocks;

determining whether the operation on the first sub-block of the first memory block is successful;

based, at least in part, on determining the operation on the first sub-block of the first memory block is successful, identifying the first sub-block of the first memory block as a sub-block relinking candidate;

identifying one or more metrics associated with the first sub-block of the first memory block; and logically linking the first sub-block of the first memory block to a first sub-block of a second memory block based, at least in part, on:

the first sub-block of the second memory block being associated with the first ordinal range of physical wordlines;

the first sub-block of the second memory block being identified as a sub-block relinking candidate; and a determination that the first sub-block of the second memory block has one or more metrics within a threshold of the one or more metrics associated with the first sub-block of the first memory block.

2. The method of claim 1, wherein the first sub-block of the first memory block and the first sub-block of the second memory block form at least a portion of a metablock when the first sub-block of the first memory block is logically linked to the first sub-block of the second memory block.

3. The method of claim 1, further comprising recording address information associated with the first sub-block of the first memory block.

4. The method of claim 1, further comprising retiring the first sub-block of the first memory block based, at least in part, on determining the operation on the first sub-block of the first memory block is unsuccessful.

5. The method of claim 1, wherein the operation on the first sub-block of the first memory block is at least one of a program operation and an erase operation.

6. The method of claim 1, further comprising:

executing an operation on the second sub-block of the first memory block of the one or more memory blocks;

determining whether the operation on the second sub-block of the first memory block is successful; and based, at least in part, on determining the operation on the second sub-block of the first memory block is successful, identifying the second sub-block of the first memory block as a sub-block relinking candidate.

7. The method of claim 6, further comprising logically linking the second sub-block of the first memory block to a second sub-block of a second memory block, the second sub-block of the second memory block being associated with the second ordinal range of physical wordlines and identified as a sub-block relinking candidate.

8. The method of claim 6, wherein the operation on the second sub-block of the first memory block is at least one of a program operation and an erase operation.

9. The method of claim 1, wherein the one or more metrics associated with the first sub-block of the first memory block includes one or more of a number of program erase cycles and an identifier associated with the first sub-block of the first memory block.

10. A data storage device, comprising:

a controller; and a memory block relinking system associated with the controller and operable to:

execute at least one operation on at least one of a first sub-block and a second sub-block of a memory block that has been identified as a grown bad block, the first sub-block being associated with a first position within the memory block and the second sub-block being associated with a second position within the memory block;

identify the at least one of the first sub-block and the second sub-block of the memory block as a relinking candidate based, at least in part, on a determination that the at least one operation that was executed on the at least one of the first sub-block and the second sub-block is successful;

identify one or more metrics associated with the at least one of the first sub-block and the second sub-block; and logically link the at least one of the first sub-block and the second sub-block to a sub-block of another memory block based, at least in part, on:

a determination that the one or more metrics associated with the sub-block of the another memory block are within a threshold of the one or more metrics associated with the at least one of the first sub-block and the second sub-block;

the sub-block of the another memory block is identified as a relinking candidate; and the sub-block of the another memory block is associated with a corresponding position within the another memory block.

11. The data storage device of claim 10, wherein the operation is at least one of a program operation and an erase operation.

12. The data storage device of claim 10, wherein the memory block relinking system is further operable to retire the at least one of the first sub-block and the second sub-block of the memory block based, at least in part, on a determination that the execution of the at least one operation is unsuccessful.

13. The data storage device of claim 10, wherein logically linking the at least one of the first sub-block and the second sub-block to the sub-block of the another memory block forms at least a portion of a metablock.

14. The data storage device of claim 10, wherein a frequency of identifying the at least one of the first sub-block and the second sub-block of the memory block as a relinking candidate is based, at least in part, on an operating state of the data storage device.

15. The data storage device of claim 10, wherein the one or more metrics includes one or more of a number of program erase cycles and an identifier associated with the at least one of the first sub-block and the second sub-block.

16. A data storage device, comprising:

means for executing an operation on a sub-block of a first memory block of one or more memory blocks that have been identified as a grown bad block, the sub-block of the first memory block being associated with an ordinal range of physical wordlines;

means for determining whether the operation on the sub-block of the first memory block is successful;

means for identifying the sub-block of the first memory block as a sub-block relinking candidate based, at least in part, on a determination that the operation on the sub-block of the first memory block is successful;

means for identifying one or more metrics associated with the sub-block of the first memory block; and means for logically linking the sub-block of the first memory block to a sub-block of a second memory block based, at least in part, on:

a determination that the sub-block of the second memory block has one or more metrics within a threshold of the one or more metrics associated with the sub-block of the first memory block;

the sub-block of the second memory block is associated with the ordinal range of physical wordlines; and the sub-block of the second memory block is identified as a sub-block relinking candidate.

17. The data storage device of claim 16, further comprising means for recording address information associated with the sub-block of the first memory block.

18. The data storage device of claim 16, further comprising means for retiring the sub-block of the first memory block based, at least in part, on a determination that the operation on the sub-block of the first memory block is unsuccessful.

19. The data storage device of claim 16, wherein the operation on the sub-block of the first memory block is at least one of a program operation and an erase operation.

20. The data storage device of claim 16, wherein the one or more metrics associated with the sub-block of the first memory block includes one or more of a number of program erase cycles and an identifier associated with the sub-block of the first memory block.

* * * * *